US 8,167,570 B2

(12) United States Patent
Yerramalli et al.

(10) Patent No.: US 8,167,570 B2
(45) Date of Patent: May 1, 2012

(54) FLUID TURBINE BLADE AND METHOD OF PROVIDING THE SAME

(75) Inventors: Chandra Sekher Yerramalli, Niskayuna, NY (US); Shu Ching Quek, Somerville, MA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/957,324

(22) Filed: Nov. 30, 2010

(65) Prior Publication Data

US 2011/0123344 A1 May 26, 2011

Related U.S. Application Data

(63) Continuation-in-part of application No. 12/636,861, filed on Dec. 14, 2009, now abandoned.

(51) Int. Cl.
*F03B 3/12* (2006.01)
*F03D 1/06* (2006.01)
(52) U.S. Cl. ...................................................... 416/226
(58) Field of Classification Search .................. 416/226, 416/229 R, 230, 238, 241 A
See application file for complete search history.

(56) References Cited

U.S. PATENT DOCUMENTS

| 3,713,753 | A  | * | 1/1973 | Brunsch ..................... 416/226 |
| 3,765,124 | A  | * | 10/1973 | Ferris et al. ................ 416/226 |
| 3,937,425 | A  | * | 2/1976 | Harvey ..................... 244/123.5 |
| H2057 | H  | * | 1/2003 | Veers et al. ................. 416/230 |
| 6,527,515 | B2 | * | 3/2003 | Carter, Jr. ................ 416/134 A |
| 6,638,466 | B1 | * | 10/2003 | Abbott ....................... 264/238 |
| 8,061,991 | B2 | * | 11/2011 | Metivier ..................... 416/155 |
| 2009/0196755 | A1 | * | 8/2009 | Peace et al. .................. 416/226 |
| 2011/0042524 | A1 | * | 2/2011 | Hemmelgarn et al. ....... 244/203 |

FOREIGN PATENT DOCUMENTS

| EP | 1184566 | * | 3/2002 |
| GB | 707620 | * | 4/1954 |
| GB | 2254382 | * | 10/1992 |
| WO | WO2010/092168 | * | 8/2010 |

* cited by examiner

*Primary Examiner* — Edward Look
*Assistant Examiner* — Liam McDowell
(74) *Attorney, Agent, or Firm* — Ann M. Agosti

(57) ABSTRACT

A fluid turbine blade is provided. The fluid turbine blade includes a centrally disposed longitudinal spar having a substantially circumferential cross section. The fluid turbine blade also includes at least one rib assembly affixed to said longitudinal spar. The fluid turbine blade further includes a skin attached to the at least one rib.

9 Claims, 9 Drawing Sheets

FLUID TURBINE BLADE AND METHOD OF PROVIDING THE SAME

CROSS-REFERENCE TO RELATED PATENT APPLICATIONS

This application is a Continuation in Part of co-pending U.S. patent application Ser. No. 12/636,861, entitled "A WIND TURBINE BLADE AND METHOD OF PROVIDING THE SAME", filed Dec. 14, 2009, which is hereby incorporated by reference in its entirety.

BACKGROUND

The invention relates generally to fluid turbine blades and more particularly, to a fluid turbine blade including a circular spar.

Commonly, fluid turbines are employed to generate electricity from kinetic energy of fluids. Two non-limiting turbine examples include wind energy and marine hydrokinetic energy turbines. Such turbines include three major components: a structural support component, a generator component and a rotor component. The rotor component further includes turbine blades that are employed to convert the kinetic energy of fluid to a mechanical energy. Furthermore, the mechanical energy is converted to electricity with the help of the generator component.

Typically, wind turbine blades, for example, include a rectangular or I shaped spar disposed along a span of the wind turbine blade. The spar carries a major portion of a load induced by the kinetic energy of the wind on the wind turbine blade. The load is directed at an angle on the wind turbine blade and results in a multiaxial loading of the rectangular or I shaped spar. The multiaxial state of loading including flapwise bending, edgewise bending and torsion, induces warping of the rectangular or I-shaped spar and results in higher stresses in the rectangular or I shaped spar. Therefore, the multiaxial state of loading leads to an inefficient design and excess material utilization. The excess material utilization results in a heavier wind turbine blade. Furthermore, the inefficient design increases the maintenance cost and reduces life of the wind turbine blade Advanced aeroelastic axial-twist coupling is seen as a way to shed the multiaxial load and a control mechanism. The wind turbine blades with rectangular or I-beam spars are not conducive for inducing the axial twist coupling and results in a more complicated aerodynamic shape to achieve axial twist coupling. The complicated shapes lead to increased cost of manufacturing and design complexity.

Hence, there is a need for an improved fluid turbine blade design to address one or more aforementioned issues.

BRIEF DESCRIPTION

In accordance with one aspect of the invention, a fluid turbine blade is provided. The fluid turbine blade includes a centrally disposed longitudinal spar having a substantially circumferential cross section. The fluid turbine blade also includes at least one rib assembly affixed to the longitudinal spar. The fluid turbine blade further includes a skin attached to the at least one rib assembly.

In accordance with another aspect of the invention, a method of fabricating a fluid turbine blade is provided. The method includes centrally disposing a longitudinal spar having a substantially circumferential cross section. The method also includes affixing at least one rib assembly to said longitudinal spar. The method further includes attaching a skin to said at least one rib assembly.

In accordance with yet another aspect of the invention, a method of assembly of a fluid turbine blade is provided. The method includes forming multiple modules of the fluid turbine blade. The method also includes successively coupling the multiple modules to each other to form the fluid turbine blade wherein the blade includes a centrally disposed longitudinal spar having a substantially circumferential cross section, at least one rib assembly affixed to the longitudinal spar and a skin attached to the at least one rib assembly.

In accordance with another aspect of the invention, a method of transportation of a fluid turbine blade is provided. The method includes providing multiple modules of the fluid turbine blade. The method also includes transporting the multiple modules to a desired location via a vehicle. The method further includes assembling the multiple modules to form the fluid turbine blade wherein the blade includes a centrally disposed longitudinal spar having a substantially circumferential cross section, at least one rib assembly affixed to the longitudinal spar and a skin attached to the at least one rib assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include an improved fluid turbine blade that discloses a longitudinal spar disposed at a center of the fluid turbine blade having a substantially circumferential cross section configured to provide an axial twist coupling to the fluid turbine blade. The fluid turbine blade also includes at least one rib assembly affixed to the longitudinal spar. The at least one rib assembly is attached to a skin of the fluid turbine blade for transferring load from the skin to the longitudinal spar. Although wind turbine blades are discussed for purposes of example, the invention is also applicable to other types of fluid blades with marine hydrokinetic energy turbine blades being one such example.

Conventionally, a wind turbine blade includes a rectangular or I shaped spar and a skin attached above the rectangular or I shaped spar. The spar is enclosed within the skin and is attached to the skin along a span of the wind turbine blade. The skin is in direct contact with an incoming flow of wind. In operation, the wind flow comes in contact with the aerodynamic profile of the wind turbine blade and transfers a kinetic energy of the wind flow to the wind turbine blade in the form of a multiaxial state of loads. The rectangular or I shaped spar is the stiffest structural member of the wind turbine blade and carries bulk of the multiaxial load. The resultant from the multiaxial wind loading is not always aligned along the principal directions of the wind turbine blade. The resultant from the multiaxial wind loading results in a combination of bending and twisting to happen in the wind turbine blade and in the rectangular or I shaped spar. The bending and warping creates to higher design stresses resulting in manufacturing a heavier blade and furthermore, an increased cost of electricity. Therefore, an improved design for a wind turbine blade is described below.

Figure 1:
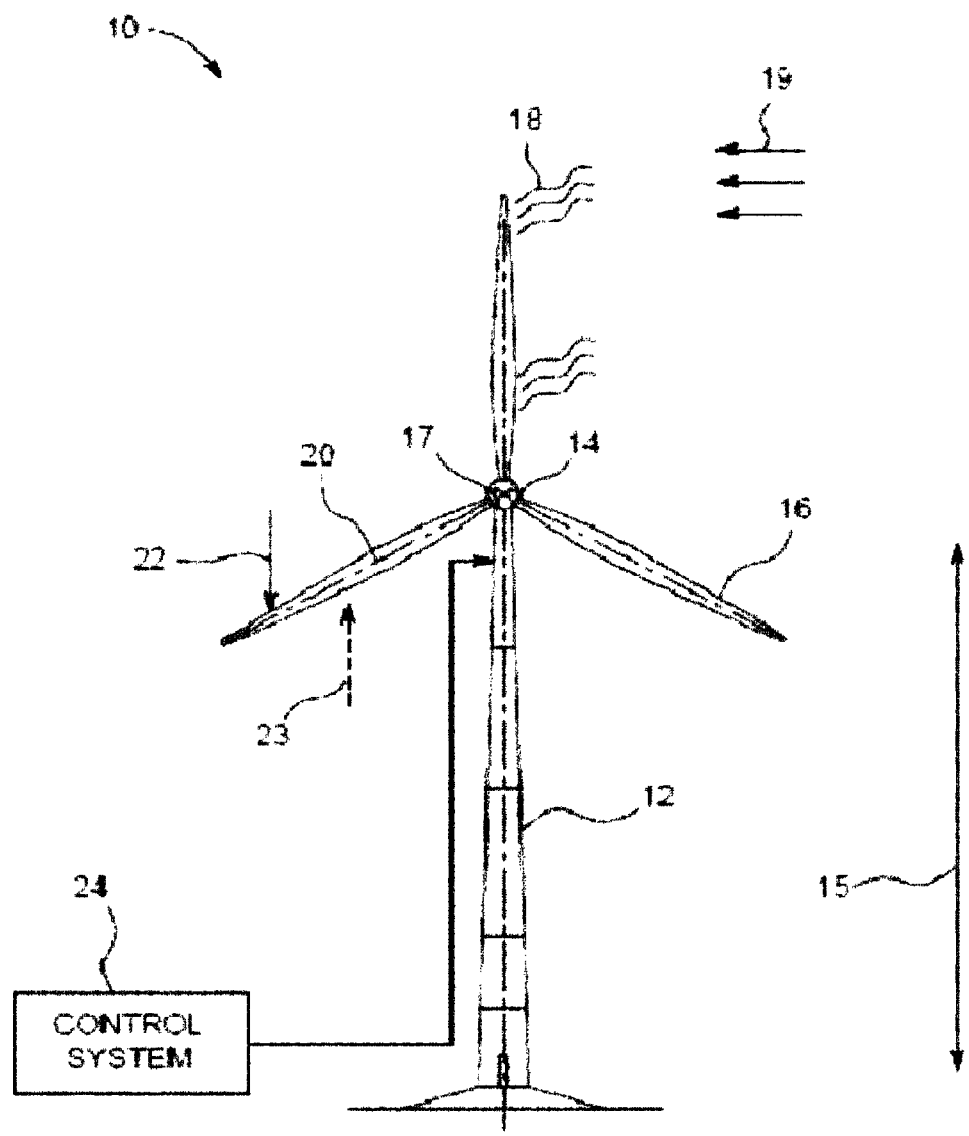
FIG. 1 is a schematic illustration of an exemplary wind turbine blade system 10 in accordance with an embodiment of the invention.

FIG. 1 is a schematic view of an exemplary fluid turbine blade system 10 which is illustrated as a wind turbine blade for purposes of discussion. The wind turbine blade system 10 is employed to convert wind energy to electricity. Generally, the wind turbine blade system 10 includes a tower 12 to support an alternator 14 at a height 15 selected based upon factors and conditions known in the prior art. A tower mount (not shown) is provided at a top of the tower 12 to attach the alternator 14. The alternator 14 generates electricity by utilizing mechanical energy provided by wind turbine blades 16. The wind turbine blades 16 are attached to the alternator 14 via a blade mount 17 disposed at the alternator 14. The wind turbine blades 16 rotate via a lift force 18 provided by the incoming flow of wind 19 and convert the wind energy into mechanical energy. The wind turbine blades 16 include a longitudinal spar 20 having a substantially circumferential cross section to carry a load represented by reference numeral 22 induced by the lift force 18. A drag force 23 acts in an opposite direction to the lift force 18. The drag force 23 is induced via a resistance caused by friction in a direction opposite to that of the motion of the wind turbine blade 16. A control system 24 may be electrically coupled to control multiple parameters of the wind turbine blades 16. In one embodiment, the control system 24 changes the direction of the wind turbine blades 16 in response to a change in direction of the incoming flow of wind 19. In another embodiment, the control system 24 controls the speed of rotation of the wind turbine blades 16. The design of the wind turbine blades 16 will be described in detail with reference to FIG. 2 below.

Figure 2:
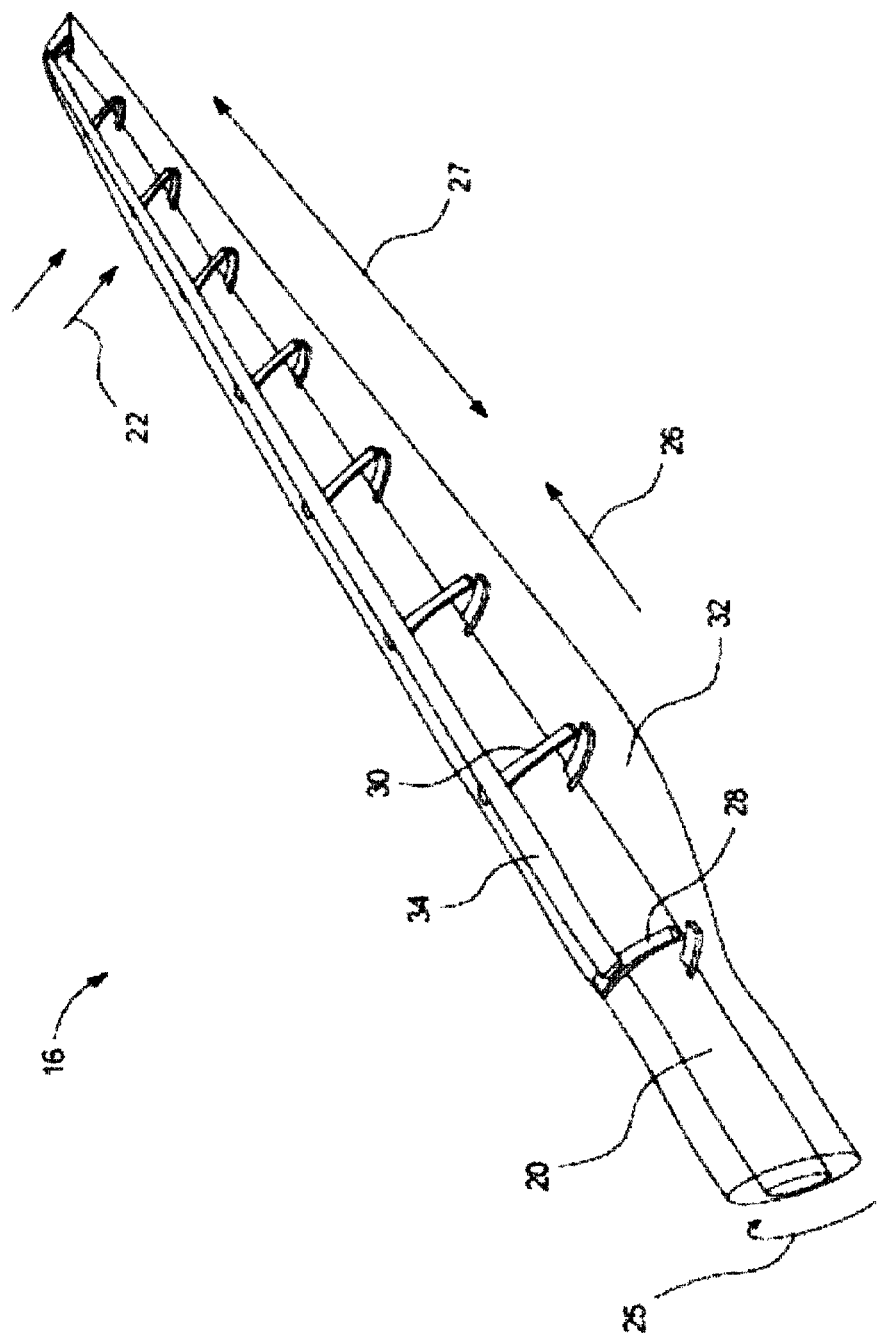
FIG. 2 is a schematic representation of a wind turbine blade in the wind turbine blade system shown in FIG. 1.

In an illustrated embodiment of the invention as shown in FIG. 2, a schematic representation of a wind turbine blade 16 of the wind turbine blade system 10 (FIG. 1) is depicted. The longitudinal spar 20 having a substantially circumferential cross section is disposed at a center of the wind turbine blade 16. As used herein "substantially circumferential cross section" means a cross section having a shape, such as a circle or an ellipse, with a substantially curved perimeter. In one embodiment of the invention, the centrally disposed longitudinal spar 20 includes a hollow spar. In an alternative embodiment, the centrally disposed longitudinal spar 20 includes a solid or filled spar. The substantially circumferential cross section of the longitudinal spar 20 disperses the load 22 (FIG. 1) uniformly along the longitudinal spar 20 and provides a minimum axial twist represented by reference numeral 25 to the longitudinal spar 20. In yet another embodiment of the invention, the circular shape and the elliptical shape includes a tapering diameter in a direction 26 along a span 27 of the wind turbine blade 16. Furthermore, the wind turbine blade 16 includes at least one rib assembly 28 affixed to the longitudinal spar 20. In an exemplary embodiment, the at least one rib assembly 28 is uniformly spaced apart from a second rib assembly 30 affixed to the longitudinal spar 20. The at least one rib assembly 28 is attached to a skin 32 via a spar cap 34, the spar cap 34 being disposed above the at least one rib assembly 28. In an embodiment of the invention, the skin 32 is fabricated by composite glass or carbon fibers. The fabrication of the skin 32 will be described in greater detail with reference to a cross sectional view of a module 40 of the wind turbine blade 16 as shown in FIG. 3.

Figure 3:
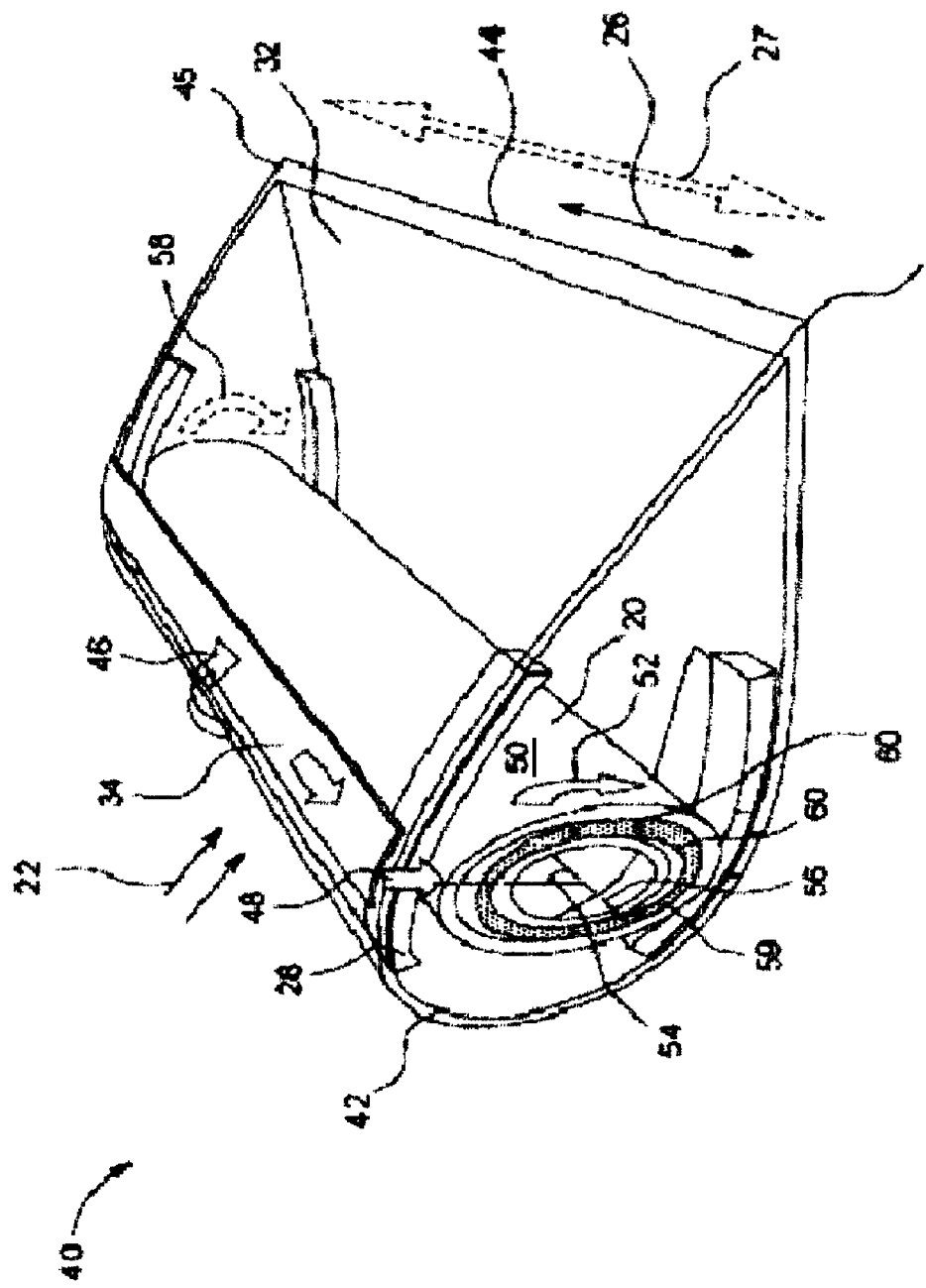
FIG. 3 is a magnified cross-sectional view of a module of the wind turbine blade shown in FIG. 2.

Referring to FIG. 3, the skin 32 is fabricated via attaching a leading edge piece 42 and a trailing edge piece 44 via an adhesive. In an embodiment of the invention, the leading edge piece 42 and the trailing edge piece 44 are fabricated separately. In another embodiment of the invention, the leading edge piece 42 and the trailing edge piece 44 are attached at a span point 45 along the span 27 of the wind turbine blade 16 (FIG. 2). As used herein, the term 'span point' 45 refers to an edge of the module 40 along the span 27 of the wind turbine blade 16. Such fabrication of the leading edge piece 42 and the trailing edge piece 44 provides enhanced smoothness and sharpness to the leading edge piece 42 and the trailing edge piece 44 respectively. Furthermore, the enhanced smoothness and sharpness increases aerodynamic and aeroacoustic performance of the wind turbine blade 16 (FIG. 2) respectively. As illustrated herein, the skin 32 (FIG. 2) is attached to the at least one rib assembly 28 via a second adhesive. In operation, the skin 32 receives the load 22 (FIG. 1) resulting in a skin load 46. The skin 32 transfers the skin load 46 to the at least one rib assembly 28 via the spar cap 34 resulting in a rib load 48. Such a structural configuration enables fabrication of the skin 32 with a desired minimum thickness of about 10 millimeter to about 12 millimeter resulting in utilization of minimal amount of fabricating material thus reducing cost of manufacturing of the wind turbine blade 16. Additionally, employing the skin 32 reduces weight of the wind turbine blade 16 resulting in a lightweight wind turbine blade system 10 (FIG. 1).

Furthermore, in certain embodiments, the at least one rib assembly 28 (FIG. 2) is a curved member fabricated from at least one from a group of glass composite, carbon composite or a combination thereof. In another embodiment of the invention, the at least one rib assembly 28 is a hollow or a solid rib assembly depending on design and weight constraints. In yet another embodiment, the at least one rib assembly 28 is fabricated via commonly known processes such as either one from a group of automated fiber/tow placement with preimpregnated fibers/tow or vacuum assisted resin transfer molding (hereinafter VARTM) process. The at least one rib assembly 28 is attached to an outer surface 50 of the longitudinal spar 20 via any one from a commonly known group of an adhesive, a wet layup process or a suitably designed riveting process. Furthermore, the at least one rib assembly 28 transfers the rib load 48 to the longitudinal spar 20 resulting in a spar load 52.

The spar load 52 is directed at an angle 54 relative to an axis 56 of the longitudinal spar 20 and induces an axial twist 58 to the longitudinal spar 20. In an embodiment of the invention, the angle 54 is an angle of attack defined as the angle at which the spar load 52 is acting upon the longitudinal spar 20. The longitudinal spar 20 is fabricated via multiple laminae 60 of a composite material to eliminate the axial twist 58. In an embodiment of the invention, the composite material includes a glass fiber, a carbon fiber or a combination thereof. In another embodiment of the invention, a cellular substance such as foam 59 is disposed between the multiple laminae 60 along the direction 26 of the span 27 to increase bending stiffness without adding significant weight. The foam 59 acts like the core of a sandwich beam, thus presence of the foam 59 improves overall bending stiffness without adding weight and also provides resistance against shear loading.

Figure 4:
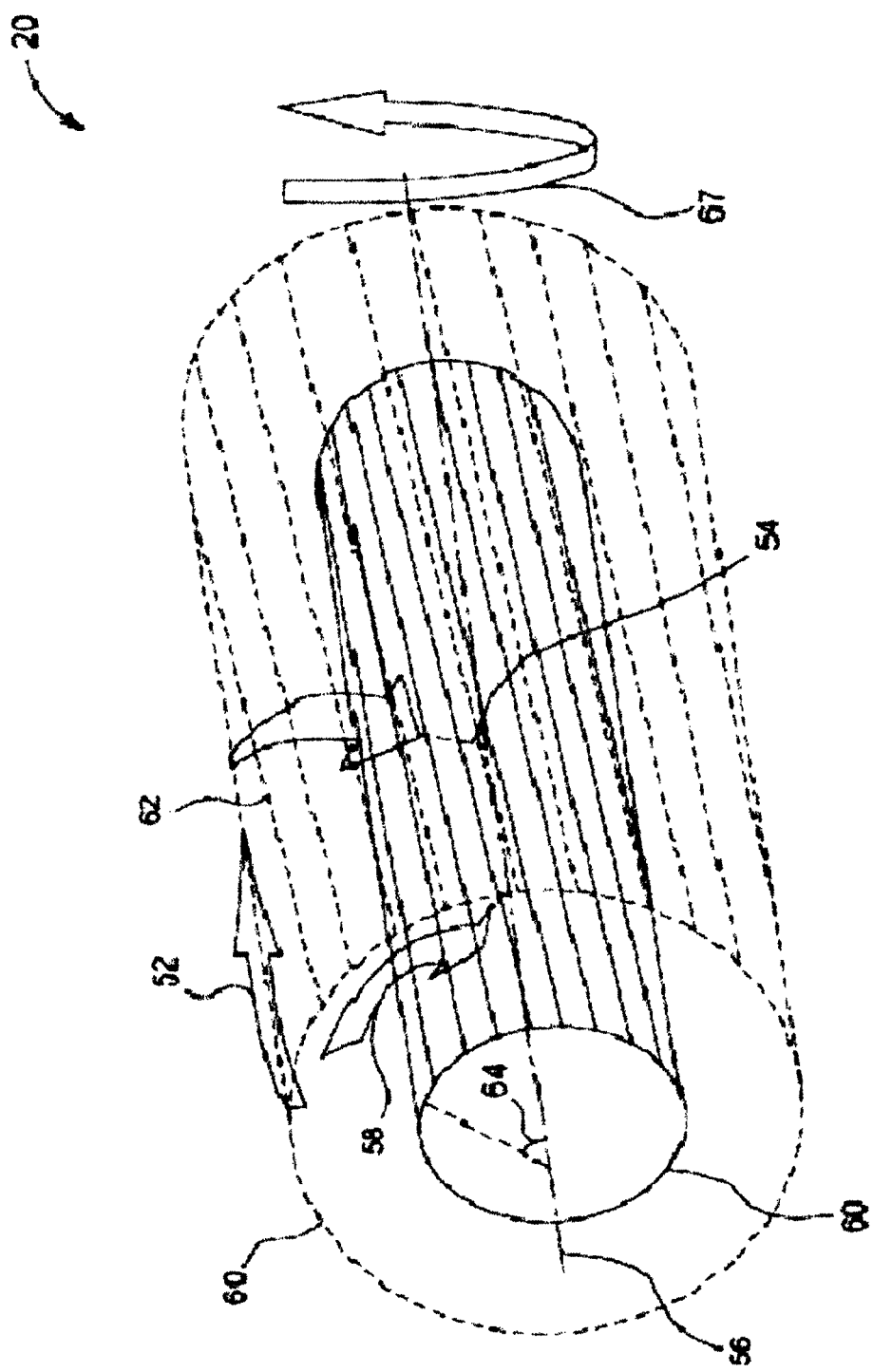
FIG. 4 is a diagrammatic illustration of a module of a spar comprising a plurality of laminae disposed at the center of the module of the wind turbine blade of FIG. 3 in accordance with an embodiment of the invention.

FIG. 4 is a diagrammatic illustration of the multiple laminae 60 including fibers 62 oriented at an angle 64 relative to the axis 56 of the longitudinal spar 20 disposed at the center of the wind turbine blade 16 of FIG. 2 in accordance with an embodiment of the invention. The multiple laminae 60 are fabricated via fibers 62 disposed at the angle 64 relative to the axis 56 of the longitudinal spar 20. The fibers 62 disposed at the angle 64 provide a coupling between bending 67 and axial twisting 58 induced within the longitudinal spar 20. In an embodiment of the invention, the angle 64 includes a range between about 10 degrees to about 15 degrees. The aforementioned range has been analytically obtained and explained in detail in FIG. 10. In operation, the twisting 58 in the wind turbine blade will depend on the bending 67 of the longitudinal spar 20. This coupling could be used to reduce the angle of attack 54. The coupling is used to shed load when the wind load increases a certain design limit. Similarly, the bend-twist coupling could be utilized to increase the angle of attack 54 with increased bending if the design so requires.

Figure 5:
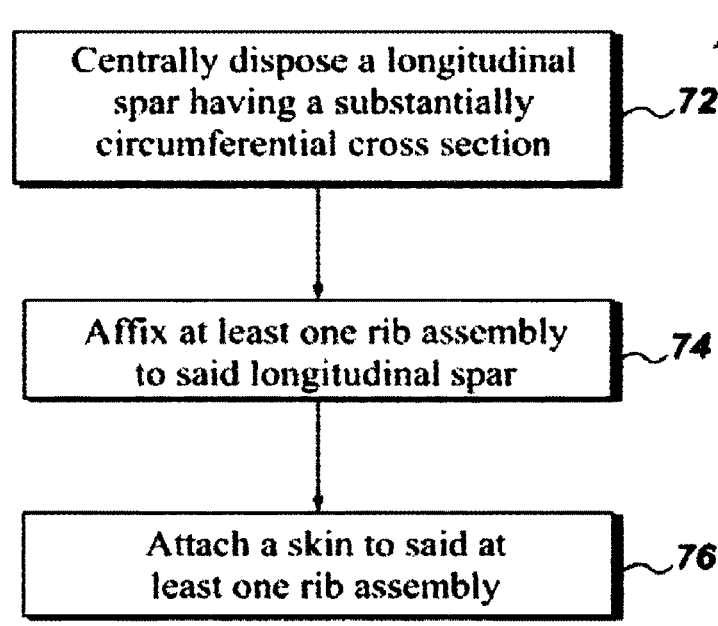
FIG. 5 is a flow chart representing steps involved in an exemplary method for fabricating the wind turbine blade of FIG. 2 in accordance with an embodiment of the invention.

FIG. 5 is a flow chart representing steps involved in an exemplary method 70 for fabricating a wind turbine blade of FIG. 2 in accordance with an embodiment of the invention. The method 70 includes disposing a longitudinal spar having a substantially circumferential cross section at a center of the wind turbine blade in step 72. In an embodiment of the invention, a hollow or a solid longitudinal spar is provided. In another embodiment of the invention, a circular shape or an elliptical shape longitudinal spar is provided. In yet another embodiment, a tapering diameter in a direction along a span of the wind turbine blade is provided to the circular shape or the elliptical shape. Furthermore, at least one rib assembly is affixed to the longitudinal spar in step 74. In an embodiment of the invention, the at least one rib assembly is attached to an outer surface of the longitudinal spar via a bonding process. In an exemplary embodiment of the invention, the bonding process is at least one from a group of an adhesive, wet lay up or suitably designed riveting process. The method 70 further includes attaching a skin to the at least one rib assembly of the wind turbine blade. In an embodiment of the invention, a spar cap is attached to the skin at the at least one rib assembly. The method 70 also includes providing multiple laminae within the longitudinal spar. In a presently contemplated embodiment, a fiber oriented at an angle relative to an axis of the longitudinal spar is disposed on the multiple laminae of the longitudinal spar in step 76. In another embodiment of the invention, the fiber is disposed at the angle in a range between about 10 degrees to about 15 degrees.

Figure 6:
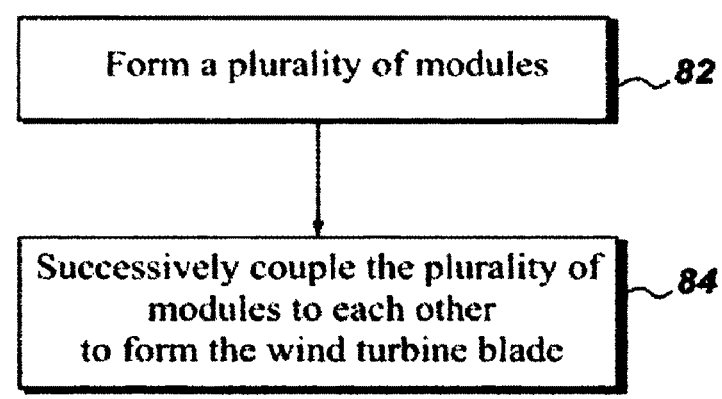
FIG. 6 is a flow chart representing steps involved in an exemplary method for assembling the wind turbine blade of FIG. 2 in accordance with an embodiment of the invention.

FIG. 6 is a flow chart representing steps involved in an exemplary method 80 for assembling a wind turbine blade of FIG. 2 in accordance with an embodiment of the invention. The method 80 includes forming multiple modules of the wind turbine blade in step 82. The multiple modules are successively coupled to each other to form the wind turbine blade in step 84 wherein each module includes a centrally disposed longitudinal spar having a substantially circumferential cross section, at least one rib assembly affixed to the said longitudinal spar and a skin attached to the said at least one rib assembly. In an exemplary embodiment of the invention the multiple modules are successively coupled via heating the module at a respective first end. In another embodiment of the invention, multiple modules are successively coupled via successively inserting adjacent modules at the respective first ends of a previous module. In yet another embodiment of the invention, an adhesive is applied at the respective first ends of the first module to adhere the module to form the wind turbine blade.

Figure 7:
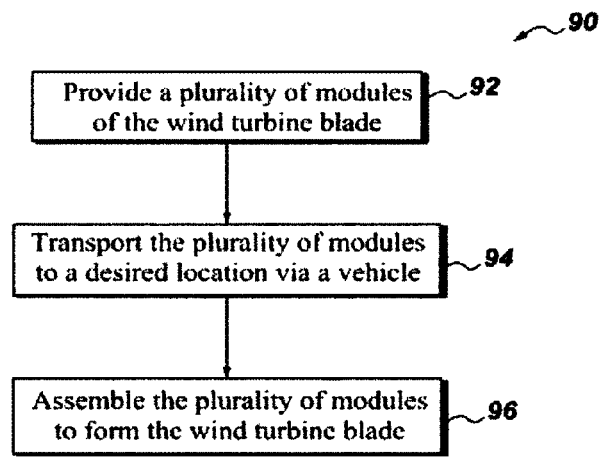
FIG. 7 is a flow chart representing steps involved in an exemplary method for transporting the wind turbine blade of FIG. 2 in accordance with an embodiment of the invention.

FIG. 7 is a flow chart representing steps involved in an exemplary method 90 for transporting a wind turbine blade of FIG. 2 in accordance with an embodiment of the invention. Method 90 includes providing multiple modules of the wind turbine blade in step 92. The multiple modules are transported to a desired location via a vehicle in step 94. The multiple modules are assembled to form the wind turbine blade at the desired location in step 96 wherein the wind turbine blade includes a centrally disposed longitudinal spar having a substantially circumferential cross section, at least one rib assembly affixed to the longitudinal spar and a skin attached to the at least one rib assembly.

EXAMPLES

The examples that follow are merely illustrative and should not be construed to limit the scope of the claimed invention. The simulations for FIGS. 8-11 were conducted using an analytical formulation available in composite material literature.

Figure 8:
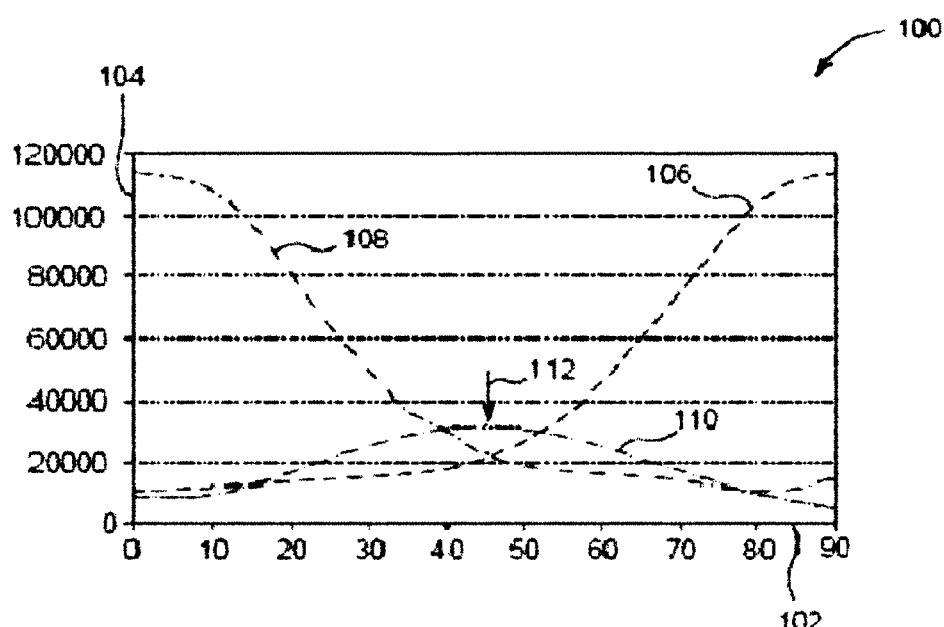
FIG. 8 is a graphical comparison of variations of an axial modulus, circumferential modulus and shear modulus of the spar of FIG. 4 relative to the fiber angle of the laminae disposed at the center of the spar

FIG. 8 is a graphical comparison 100 of variations of an axial modulus of a longitudinal spar, circumferential modulus of the longitudinal spar and shear modulus of the longitudinal spar as a function of the orientation of fibers in the lamina relative to the direction of the span of the longitudinal spar. The X-axis 102 represents fiber angle in degrees. The Y-axis 104 represents effective properties in MPa. In an embodiment of the invention, effective properties include an axial modulus, circumferential modulus and shear modulus of the longitudinal spar. Curve 106 represents variation of axial modulus of the longitudinal spar relative to the fiber angle oriented along the centrally disposed longitudinal spar. As can be seen, the axial modulus increases significantly with the increase in the fiber angle. Curve 108 represents variation of circumferential modulus of the longitudinal spar relative to the fiber angle oriented along the centrally disposed longitudinal spar. As observed, the circumferential modulus of the longitudinal spar decreases significantly as a function of the fiber angle. Curve 110 represents variation of shear modulus of the longitudinal spar relative to the fiber angle oriented along the centrally disposed longitudinal spar. As illustrated herein, the shear modulus initially increases with the fiber angle to reach maxima 112 at a fiber angle of about 45 degrees and further decreases with increase in fiber angles from about 46 degrees to about 90 degrees. Hence, a circular spar including fibers in the multiple lamina oriented to a desired degree could be designed to more efficiently utilize the axial twist load seen in the wind turbine blade.

Figure 9:
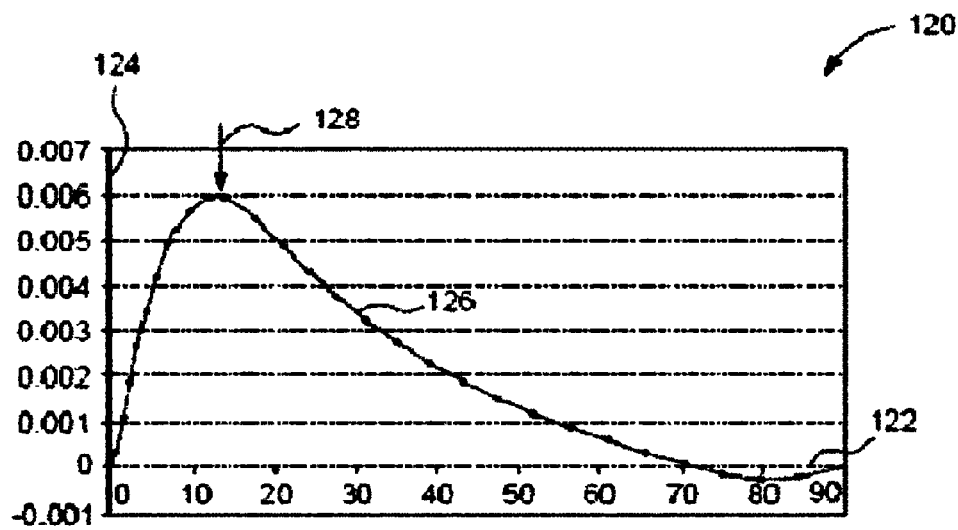
FIG. 9 is a graphical illustration of the ratio of twisting strain to axial strain as a function of the fiber orientation in the multiple laminae of the longitudinal spar in FIG. 4.

FIG. 9 is a graphical illustration 120 of axial twist couple coefficient relative to the fiber orientation angle along the centrally disposed longitudinal spar. The X-axis 122 represents fiber orientation angles along the centrally disposed longitudinal spar in degrees. The Y-axis 124 represents axial twist couple coefficient. Axial twist couple coefficient is defined as a ratio of a longitudinal strain and a shear strain. Curve 126 represents the variation in the axial twist couple coefficient relative to the fiber orientation angle along the centrally disposed longitudinal spar. As can be seen, the axial twist couple coefficient increases rapidly from 0 to about 0.005 between fiber orientation angles of 0 degrees to about 10 degrees and reaches a maxima 128 at about 0.006 at fiber angles between about 10 degrees and about 15 degrees. The axial twist couple coefficient further decreases exponentially with increase in fiber angles beyond about 18 degrees. Thus, maximum axial twist coupling is achieved at about 10 degrees to about 15 degrees and enhances passive load shedding capacity of the longitudinal spar.

Figure 10:
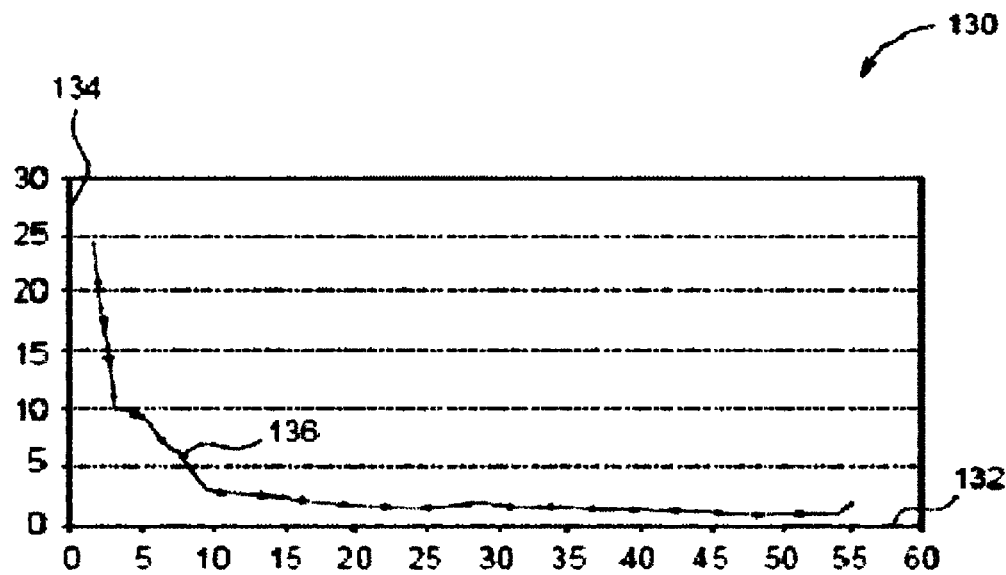
FIG. 10 is a graphical illustration of a variation in longitudinal spar thickness of the wind turbine blade of FIG. 2 relative to span points of the wind turbine blade of FIG. 2.

FIG. 10 is a graphical illustration 130 of a variation in a thickness of a wall of the longitudinal spar of the wind turbine blade relative to span points of the wind turbine blade. The X-axis 132 represents span points of the wind turbine blade. The Y-axis 134 represents longitudinal spar thickness of the wind turbine blade in mm. The curve 136 represents variation of the longitudinal spar thickness relative to the span points. As observed, the longitudinal spar thickness decreases significantly from about 24 mm to 1 mm with increase in the span points from about 2 to about 55 respectively. As illustrated herein, the wall thickness of the longitudinal spar depends on the state of loading. As the distance from the root increases the spar wall thickness could be reduced to take advantage of the reduced loading seen towards the tip. This will give rise to a longitudinal spar with tapering wall thickness and the diameter. This design will lead to a more efficient utilization of the blade material and reduced weight.

Figure 11:
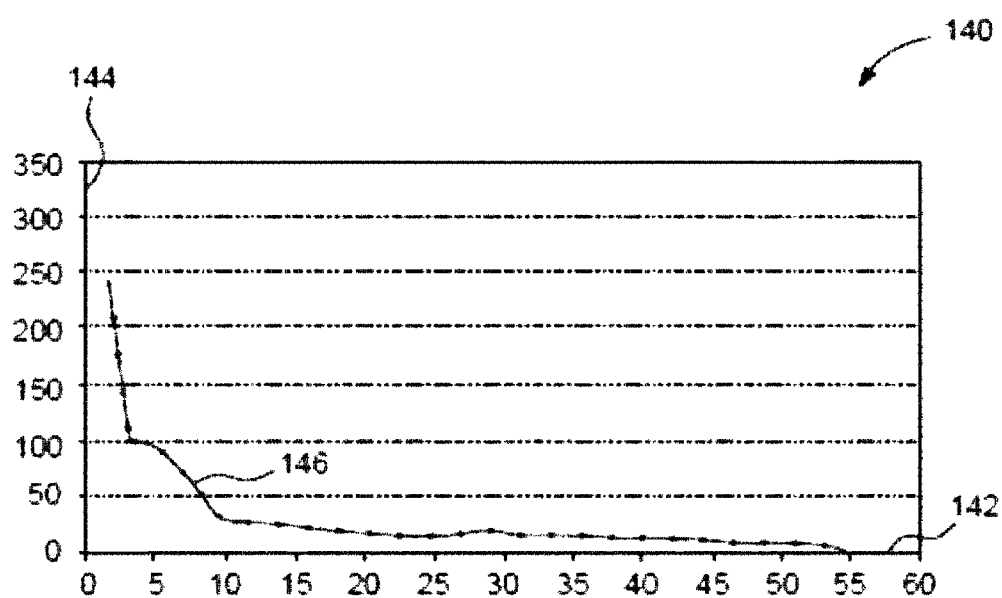
FIG. 11 is a graphical illustration of a variation in weight per unit length of the wind turbine blade of FIG. 2 relative to the span points.

FIG. 11 is a graphical illustration 140 of a variation in weight per unit length of the wind turbine blade relative to the span points. The X-axis 142 represents the span points. The Y-axis 144 represents the weight per unit length in kg/m. The curve 146 represents the weight per unit length relative to the span points. As illustrated herein, weight per unit length decreases significantly from about 290 kg/m to about 1 kg/m with increase in the span points from about 2 to about 55 respectively. Thus, increasing the span points in the wind turbine blade reduces the weight of the spar by about 40%.

Figure 12:
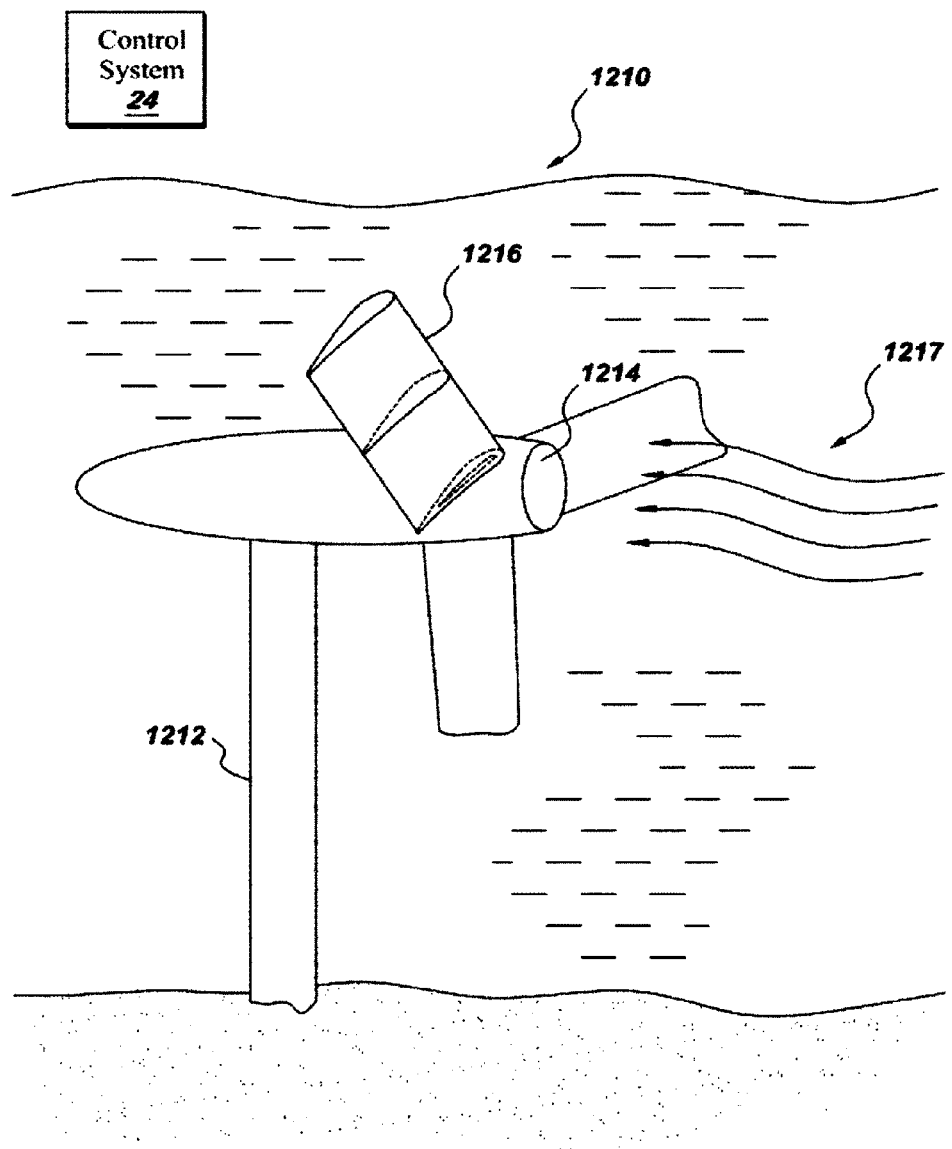
FIG. 12 is a schematic illustration of an exemplary marine hydrokinetic energy system 1210 in accordance with an embodiment of the invention.

FIG. 12 is a schematic illustration of an exemplary marine hydrokinetic energy system 1210 in accordance with an embodiment of the invention including a tower 1212, an alternator 1214, marine hydrokinetic turbine blades 1216 attached to the alternator 1214 and each including a longitudinal spar having a substantially circumferential cross section (such as shown by the spars 20 of FIGS. 3 and 4, for example), and a control system 24. The flow of marine water 1217 causes rotation of blades 1216. Marine hydrokinetic energy system 1210 may be designed, fabricated, and operated in a similar manner as discussed above with respect to wind blade turbine system 10, for example.

The various embodiments of a fluid turbine blade described above provide a fluid turbine blade with desired axial twist coupling, high efficiency and reliability. The fluid turbine blade incorporates a centrally disposed longitudinal spar having a substantially circumferential cross section that reduces the weight of the fluid turbine blade and has greater load bearing capacity. The centrally disposed longitudinal spar may comprise multiple laminae fabricated by fibers oriented at an angle along the centrally disposed longitudinal spar, which provide desirable axial twist coupling to the fluid turbine blade. The desirable axial twist coupling results in minimum maintenance cost and increases the life of the fluid turbine blade. Furthermore, the fluid turbine blade incorporates an innovative structural configuration including at least one rib assembly attached to a skin that facilitates employing a skin of reduced thickness. Thus, these techniques reduce the weight of the fluid turbine blade resulting in reduced costs of manufacturing the fluid turbine blade.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a centrally disposed hollow longitudinal spar of the fluid turbine blade with respect to one embodiment can be adapted for use with a spar cap attached to the skin at the at least one rib assembly described with respect to another embodiment of the invention. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fluid turbine blade comprising:
a centrally disposed longitudinal spar of the fluid turbine blade having a substantially circumferential cross section and comprising multiple laminae, wherein the multiple laminae comprise a composite material comprising fibers each oriented at an angle in a range between about 10 degrees to about 15 degrees relative to an axis of the centrally disposed longitudinal spar along the direction of the span of the fluid turbine blade;
at least one rib assembly affixed to said longitudinal spar; and;
a skin attached to said at least one rib assembly.

2. The fluid turbine blade of claim 1, wherein the fluid turbine blade comprises a wind turbine blade or a marine hydrokinetic energy turbine blade.

3. The fluid turbine blade of claim 1, wherein said centrally disposed longitudinal spar has an elliptical cross section.

4. The fluid turbine blade of claim 1, wherein said spar further comprises a foam disposed between the multiple laminae, and wherein said foam extends completely around a circumference of said centrally disposed longitudinal spar.

5. The fluid turbine blade of claim 3, wherein the elliptical shape comprises a tapering diameter in a direction along a span of the fluid turbine blade.

6. The fluid turbine blade of claim 1, wherein said at least one rib assembly is affixed above the centrally disposed longitudinal spar.

7. The fluid turbine blade of claim 1, wherein the fibers comprise glass fibers, carbon fibers or a combination thereof.

8. A wind turbine blade comprising:
- a centrally disposed longitudinal spar of the wind turbine blade having an elliptically shaped cross section and comprising multiple laminae and a foam disposed between the multiple laminae, wherein the multiple laminae comprise a composite material comprising fibers each oriented at an angle in a range between about 10 degrees to about 15 degrees relative to an axis of the centrally disposed longitudinal spar along the direction of the span of the fluid turbine blade;
- at least one rib assembly affixed to said longitudinal spar, wherein said at least one rib assembly is affixed above the centrally disposed longitudinal spar; and
- a skin attached to said at least one rib assembly.

9. The wind turbine blade of claim 8, wherein the elliptical shape comprises a tapering diameter in a direction along a span of the wind turbine blade.

* * * * *